July 12, 1960     D. B. SCOTT     2,945,112
MOTOR GENERATOR INDUCTION HEATING SYSTEM
Filed July 28, 1958
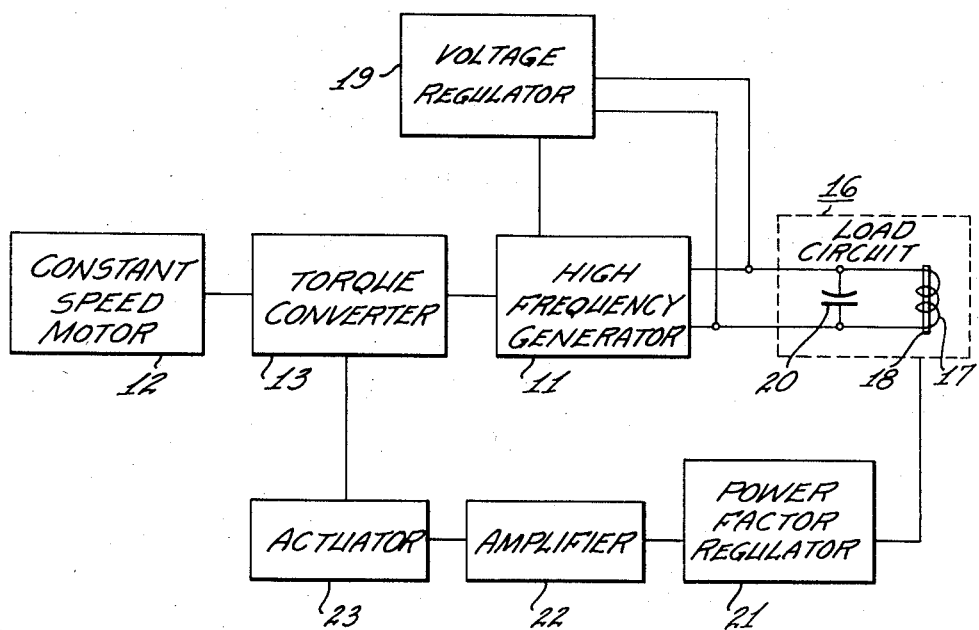
Inventor
Donald B. Scott
By Houston L. Swenson
Attorney

2,945,112
Patented July 12, 1960

2,945,112
MOTOR GENERATOR INDUCTION HEATING SYSTEM

Donald B. Scott, Wauwatosa, Wis., assignor to Allis-Chalmers Manufacturing Company, Milwaukee, Wis.

Filed July 28, 1958, Ser. No. 751,517

6 Claims. (Cl. 219—10.77)

This invention relates to an induction heating apparatus and more particularly to a means for maintaining a resonant frequency in the circuit of a variable inductive load coupled with a high frequency motor generator set.

It is generally known that in the process of induction heating the load impedance varies as the work article becomes heated. Consequently, the load impedance is no longer equal to the impedance of the high frequency generator. This mismatching of impedances results in a lack of unity power factor and, therefore, maximum efficiency of the high frequency generator is not obtained. Various systems have been used in an attempt to continually maintain unity power factor between a high frequency generator and its load circuit. Such systems usually comprise an arrangement for switching in and out capacitance in the load circuit, thereby adjusting the impedance of the load to equal the internal impedance of the generator. However, the numerous switches and capacitors required for such systems become a costly matter. Furthermore, such systems generally operate on a step curve function arrangement whereby an approximate amount of capacitance is inserted or subtracted from the circuit in order to approach unity power factor. Many of the present day commercial units which attempt to continually maintain unity power factor require a worker to stand by in order to add or subtract capacitance in the load circuit.

The control system for maintaining unity power factor in this invention is automatic and also approaches a smooth curve function rather than a step function. The power factor of a high frequency generator output circuit is a function of the resonant frequency of the load circuit. Consequently, unity power factor may be maintained by coinciding the generator's output frequency with the resonant frequency of the load circuit. In my invention this is accomplished by varying the speed of the generator in response to the power factor output at the generator load terminals.

An object of this invention is to provide a control means for operating a high frequency generator at an increased efficiency rate.

Another object of this invention is to maintain unity power factor output at the terminals of a high frequency generator.

A further object of this invention is to match the load impedance to the generator impedance.

A still further object of this invention is to operate a high frequency generator at variable speeds whereby it operates at resonant frequency over a wide range of varying inductive load values.

Objects and advantages other than those set forth above will be apparent from the following description when read in connection with the accompanying drawing, in which the figure is a schematic diagram of an embodiment of my invention.

Referring to the drawing, a conventional high frequency generator is driven by a constant speed motor 12. Mechanically coupling the motor and generator is a torque converter 13 such as a hydraulic type clutch or any other suitable type of variable clutch mechanism. The load circuit 16 of the high frequency generator 11 comprises a work coil 17 and an article 18 which is being heated. It is preferable to approach unity power factor before article 18 is heated. Therefore, to originally balance the inductive reactance of the load a capacitance 20 of predetermined value may be shunted across the load circuit between the article and generator. This capacitance is of suitable value in order that the range requirements for the generator speed controls need not be excessively large.

Electrically associated with the generator and its output is a conventional voltage regulator 19 which maintains the desired voltage output of the generator. A power factor regulator 21 is inductively associated with the load circuit. When there is a departure from unity power factor at the terminals of the high frequency generator the power factor regulator senses such departure and supplies an amplified signal by means of an amplifier 22 to an actuator 23. Actuator 23 is coupled to the torque converter and controls the driving ratio of the converter.

It is well known in the art that as an article is inductively heat treated the impedance of the load circuit is altered, thereby causing a mismatching of the impedances of the high frequency generator and load circuit. Consequently, the generator will not be operating at unity power factor unless the load circuit is corrected back to resonance. This condition has been attributed to the fact that as article 18 is subjected to heat the inductive reactance of the circuit decreases. In order to restore the circuit back to resonance the capacitive reactance of the circuit must be altered to equal the inductive reactance, which in the particular case calls for a reduction in the capacitive reactance.

The capacitive reactance of a circuit may be represented by the following equation:

$$Xc = \frac{1}{2\pi fc}$$

where $Xc$ is the capacitive reactance, $f$ is the frequency and $c$ is the capacitance. From the above equation it is apparent that the capacitive reactance may be varied by changing either the frequency or capacitance. The prior art has disclosed numerous systems which vary the capacitance $c$. The invention set forth herewith affects the frequency $f$ in order to vary the capacitive reactance $Xc$.

In operation; as article 18 is subjected to inductive heat treatment by coil 17 the inductive reactance of the load circuit decreases. Therefore, the generator 11 ceases operating at unity power factor, a condition which is immediately detected by conventional power factor regulator 21. The signal of the regulator is preferably amplified by amplifier 22. However, the amplifier may be omitted, depending on the sensitivity of actuator 23, the strength of the signal producing regulator and the degree of resonance control desired.

In the present case the object is to decrease the capacitive reactance $Xc$ which, as indicated in the above equation, may be achieved by increasing the frequency output $f$ of the generator. To accomplish this objective actuator 23, in response to the amplified signal, increases the driving ratio of the torque converter. The power transmitted from motor 12 to generator 11 is also increased and as a result the generator speed and frequency output are increased. Upon restoration of resonant operation the power factor regulator continues to regulate the speed of the generator to maintain and restore unity power factor as needed.

Assuming that the torque converter has a wide and flexible range of driving ratio variations, unity power factor may be maintained at a high degree of accuracy. In the prior art where capacitors were added to the circuit an extremely large number of capacitors and switches would be needed to approach such a smooth unity power factor curve. The cost and space required have made any such elaborate setup of many capacitors and switches impractical. The novel arrangement I have described may be constructed at a reasonable cost and is a relatively compact unit.

While only one embodiment of the present invention has been illustrated and described it will be apparent to those skilled in the art that modifications may be made therein without departing from the spirit of the invention or from the scope of the appended claims.

Having now particularly described and ascertained the nature of my said invention and the manner in which it is to be performed, I declare that what I claim is:

1. In a motor generator high frequency heating system: a load circuit; a variable torque converter coupling said motor and generator; a phase sensitive device associated with said load circuit, said phase sensitive device producing an output signal responsive to the direction of the phase angle of the current in said load circuit; and means for varying the torque transmission of said torque converter to speed up or slow down said generator in response to said output signal to operate said generator at unity power factor.

2. In a motor generator high frequency heating system: a resonant load circuit; means coupling said motor and generator; a phase sensitive device associated with said load circuit, said phase sensitive device producing an output signal responsive to the direction of the phase angle of the circuit in said load circuit; and means responsive to the output signal of said phase sensitive device for actuating said coupling means to vary the speed of said generator and operate said generator at unity power factor.

3. In a motor generator high frequency heating system: a resonant load circuit; a variable torque converter coupling said motor and generator; a phase sensitive device associated with said load circuit, said phase sensitive device producing an output signal responsive to the direction of the phase angle of the current in said load circuit; and means for varying the driving ratio of said torque converter in response to the output signal of said phase sensitive device to vary the frequency output of said generator and maintain the capacitive reactance of said load circuit substantially equal to the inductive reactance of said load circuit.

4. In a motor generator high frequency induction heating system: a resonant load system; means coupling said motor and generator; a signal producing phase regulator inductively associated with said load circuit, said regulator producing an output signal responsive to the magnitude and direction of the phase angle between the current and voltage of said load circuit; and an actuator coupled between said phase regulator and said coupling means, said coupling means responsive to said actuator in accordance with the output signal of said phase regulator to vary the speed of said generator and maintain unit power factor in said load circuit.

5. In a motor generator high frequency induction heating system: an inductive load circuit; a variable torque converter coupling said motor and generator; a signal producing phase regulator inductively associated with said load circuit, said regulator producing an output signal proportional to the magnitude and direction of the phase angle of current in said load circuit; and an actuator coupled between said phase regulator and said torque converter, said actuator varying the torque transmission of said torque converter in response to the output signal of said phase regulator to vary the speed of said generator and establish unity power factor in said load circuit.

6. In a motor generator high frequency induction heating system: an inductive load circuit; a variable torque converter coupling said motor and generator; a signal producing phase regulator inductively associated with said load circuit, said regulator producing an output signal proportional to the magnitude and direction of the phase angle of the current in said load circuit; and an actuator coupled between said phase regulator and said converter, said actuator increasing the driving ratio of said torque converter in response to the output signal of said phase regulator as the inductance of said load increases to raise the output frequency of said generator and maintain unit power factor in said load circuit.

References Cited in the file of this patent

UNITED STATES PATENTS

| | | |
|---|---|---|
| 2,524,515 | Chapman | Oct. 3, 1950 |
| 2,721,305 | Steinitz | Oct. 18, 1955 |
| 2,854,617 | Johnson | Sept. 30, 1958 |

FOREIGN PATENTS

| | | |
|---|---|---|
| 463,097 | Great Britain | Mar. 22, 1937 |